United States Patent [19]

Yam

[11] Patent Number: 4,462,543
[45] Date of Patent: Jul. 31, 1984

[54] NOZZLE

[75] Inventor: Benny S. Yam, West Chester, Ohio
[73] Assignee: The Procter & Gamble Company, Cincinnati, Ohio
[21] Appl. No.: 334,275
[22] Filed: Dec. 24, 1981
[51] Int. Cl.$^3$ .............................................. B05B 7/00
[52] U.S. Cl. ........................................ 239/8; 239/400; 239/428
[58] Field of Search ................ 239/8, 399, 400, 416.5, 239/422, 423, 427.5, 428, 432

[56] References Cited

U.S. PATENT DOCUMENTS

| | | | |
|---|---|---|---|
| 1,798,195 | 3/1931 | Dreibelbis. | |
| 1,995,934 | 3/1935 | Mangold | 158/110 |
| 2,760,821 | 8/1956 | Kenney | 299/86 |
| 3,010,658 | 11/1961 | Rutter | 239/399 |
| 3,458,138 | 7/1969 | Yankee | 239/428 |
| 3,561,677 | 2/1971 | Norris | 239/15 |
| 3,563,459 | 2/1971 | Kautz | 239/8 |
| 3,717,306 | 2/1973 | Hushon et al. | 239/404 |
| 3,719,325 | 3/1973 | Cerva et al. | 239/405 |
| 3,764,069 | 10/1973 | Runstadler, Jr. et al. | 239/8 |
| 3,929,291 | 12/1975 | Ladisch | 239/425 |
| 4,022,379 | 5/1977 | Ladisch | 239/8 |
| 4,073,436 | 2/1978 | Behr | 239/8 |

FOREIGN PATENT DOCUMENTS

| | | | |
|---|---|---|---|
| 880212 | 9/1971 | Canada | 239/8 |
| 1188582 | 4/1970 | United Kingdom. | |

Primary Examiner—John J. Love
Assistant Examiner—Jon M. Rastello
Attorney, Agent, or Firm—Richard C. Witte; John V. Gorman; Ronald J. Snyder

[57] ABSTRACT

A spray mixing nozzle and a method for reacting an acidic fluid and a basic fluid by using the spray mixing nozzle. The nozzle includes a central channel, at least one intermediate annular channel surrounding said central channel, an outer annular channel and a mixing chamber having a generally cylindrical upper section, a generally conically-shaped lower section and an axially aligned discharge orifice. The acidic fluid and the basic fluid are directed through the central channel and the intermediate annular channel into the upper section of the mixing chamber at relatively low velocities and a pressurized gas is simultaneously directed through the outer annular channel into the upper section of the mixing channel at a relatively high velocity. The high velocity gas acts to strip apart and at least partially atomize the acidic fluid stream and the basic fluid stream in the upper section of the mixing chamber. The gas and the partially atomized fluids are then subjected to a high degree of turbulence in the lower section of the mixing chamber and thereby substantially completely atomize and mix the fluids. The mixed and atomized fluids then begin to react and form a powdery or highly viscous paste product which is discharged from the discharge orifice.

9 Claims, 3 Drawing Figures

NOZZLE

The present invention relates to nozzles having an internal mixing chamber and to a method of atomizing and mixing fluid reactants.

In particular, the present invention relates to a nozzle in which an acid can be continuously neutralized by a base to form a powdery or highly viscous product.

BACKGROUND ART

The use of nozzles to promote chemical reactions is old in the art. Nozzles have been designed to accomplish a variety of mixing and atomization tasks with a large variety of fluids and gases. The mixing and/or atomization in conventional nozzles is usually accomplished by a forceful uniting of the liquids and gases either internally in a mixing chamber or externally by directing the liquids into each other's pathway. Where the mixing and atomization is to be accomplished internally, as in a mixing chamber, the nozzle is usually designed to facilitate the forceful joining of the fluids in order to induce a sudden high turbulence.

For example, U.S. Pat. No. 3,764,069 issued to P. W. Runstadler, Jr. on Oct. 9, 1973 discloses a method and apparatus for atomizing and spraying liquids. The liquid to be sprayed is supplied under a pressure of from 2–7 atmospheres (gauge) through liquid passage 43 and is caused to flow in a thin film through annular flow passage 68. Streams of gas at a slightly higher pressure are impinged against the liquid film such that the air-to-liquid mass ratio is from 0.1 to 1.6 and such that the gas is sheared and broken up into microbubbles which are entrained in the liquid to form a froth. The mixture is then directed through section 89 and through passageway 75 where the pressure decreases gradually so that the bubbles tend to expand slightly, thereby tending to make the froth mixture become more homogeneous. The mixture is then discharged through nozzle orifice 78 whereupon the air bubbles explode, rupturing the liquid film and causing the liquid to disintegrate into finely atomized drops.

U.S. Pat. No. 3,719,325 issued to A. Cerva et al. on Mar. 6, 1973 discloses a nozzle for a pneumatic-hydraulic head for cleaning of molds for pressure casting of metal and depositing a layer of separating material on the mold surface. The nozzle comprises a nozzle head 1 having a central passageway 7, an annular passageway 9 and a chamber 10, a nozzle body 2 centrally located in chamber 10 such that there is a narrow annular passageway between the inner wall of chamber 10 and the outer wall of body 2 and having a central passageway 4 that connects with passageway 7, and hood 6 having a swirl chamber 12 and discharge orifice 8. Pressurized air is directed through passageway 9 and chamber 10 into spiral-shaped mixing channel 11 that is formed between part of the inner wall of hood 6 and part of the outer wall of body 2. The liquid separating material is directed through passageways 7 and 4 and then via transfer channel 5 into mixing channel 11 where it is thoroughly mixed with the air. The mixture is then swirled through chamber 12, which causes the separating material to be atomized, and the mixture is then discharged through orifice 8.

A slightly different approach to the mixing and atomizing of liquids and gases might make use of both internal and external contacting of the fluids for complete mixing and atomization. For example, U.S. Pat. No. 1,995,934 issued to W. B. Mangold on Mar. 26, 1935 discloses a gas burner having several concentric channels for feeding several different fluids. A central passageway 10 is for air only. The surrounding shorter annular passageway 24 is for gas and it mixes internally with air from a third passageway 14 which surrounds passageway 24. The mixing of the gas from passageway 24 and air from passageway 14 is further facilitated by double conical screen 28. Two additional annular passageways for air which surround passageway 15, direct additional streams of air to the burner exit where the unmixed air mixes with the air and gas mixture exiting from passageway 15.

Yet another approach to mixing and atomizing employs several nozzles that are mounted one inside the other such that mixing occurs at the several points where the nozzles discharge into the next succeeding nozzle. For example, U.S. Pat. No. 3,717,306 issued to J. R. Hushon et al. discloses a nozzles for spraying foaming materials. The nozzle comprises two concentric nozzle members. One material 18 flows through the central nozzle via the concentric channel 12, tangentially into the central annular space 13 which causes it to swirl as it flows through outlet end 10. The second material 16 flows through the annular chamber 15, and into space 28 via the tangentially disposed openings 29 which causes it to swirl as it empties, along with the first material, into space 30 where the materials are mixed and reacted to form the foam product.

A further method for mixing and atomizing involves externally mixing the several materials. For example, U.S. Pat. No. 3,929,291 issued to G. Ladisch on Dec. 30, 1975 discloses a spray mixing nozzle for reacting acid and base. The nozzle comprises a central pressurized gas channel 1, at least two surrounding annular channels 2 and 3 for acid and base and an outer annular channel for pressurized gas. The discharge outlet of the outer annular channel tapers conically and discharges the pressurized gas in a converging direction to thereby force the acid and base against the central air discharge and forcefully mix and atomize the acid and base so that they will react. The ratio of the throughflow diameters for the pressure gas in the central pressure gas channel and in the outer annular gas channel is preferably in a ratio of from 1:3 to 1:10. The nozzle also includes a water spray nozzle 12 that directs a stream of water against the spray mixing nozzle to prevent a buildup of a crust that can frequently form when spraying highly concentrated acids with concentrated alkali solutions. A divisional case, now U.S. Pat. No. 4,022,379 which issued to G. Ladisch et al. on May 10, 1977, discloses the identical spray mixing nozzle without the water nozzle 12.

Canadian Pat. No. 880,212, which issued to O. Pfrengle on Apr. 22, 1970, discloses a process for reacting a basic liquid phase with an acidic liquid phase and an air pressure mixing nozzle for carrying out the similar neutralization process. The nozzle is similar to the above-described Ladisch patent and comprises two concentric canals or ducts surrounding a central bore. The acidic liquid and the basic liquid are passed through the central bore and the inner of the two concentric canals. Compressed air between about 1 and about 4 atmospheres, gauge, is passed through the outer canal. The discharge exits from the two concentric canals are generally conically tapered so that the liquids and gas will impinge on one another. The liquids are atomized by the air pressure and are substantially mixed immediately after leaving the nozzle and any unmixed portion is mixed within a distance beyond the nozzle of from about 300 to 800 centimeters. Upon mixing, the acid and base react to form a highly viscous product.

The above-described art discloses a wide variety of nozzles and methods for atomizing and mixing several fluids and gases. However, whenever there has been a need to combine several materials that will react with one another and that will produce a highly viscous material such as the acid and base mixing described in Ladisch and the urethane foam of Heshon et al. the procedure is normally to externally atomize and/or mix the materials to avoid having to deal with either a developing reaction and controlling it or a thick material that may tend to clog the nozzle. The atomization and mixing of an acidic liquid such as an organic acid with long carbon chains and a concentrated basic liquid are prime examples of materials that are handled using this approach. However, the use of external mixing is both inefficient and energy intensive. On the other hand, the more preferred process (high energy transfer) of internal mixing has heretofore not been successfully employed for the acid and base reaction or, for that matter, for handling the mixing of those materials where the final product was highly viscous.

Accordingly, an object of this invention is to provide a method and apparatus for atomizing and mixing liquids and/or gases internally in the apparatus.

A further object of this invention is to provide a new method and apparatus for effecting and controlling a chemical reaction between the liquids and/or gases that have been mixed and atomized, internally in the apparatus to form a powdery or highly viscous product.

A still further object of the invention is to provide a process for effecting a chemical reaction and for atomizing and mixing several liquids and/or gases that is both efficient and uses a minimum of energy.

DISCLOSURE OF THE INVENTION

Accordingly, this invention provides for a nozzle reactor comprising a spray nozzle having a distal end with a discharge orifice therein and an internal mixing chamber of generally cylindrical form with its axis extending in the direction of fluid movement therethrough. The mixing chamber, which is in communication and axially aligned with said discharge orifice, has an axially extending upper section with a cross sectional area substantially greater than that of the discharge orifice and a lower section having a generally conically shaped wall therein which provides the transition from the upper section to said discharge orifice. A plurality of concentric, axially aligned channels terminate at an end of said mixing chamber remote from said discharge orifice. The channels include a central channel and at least one intermediate channel of annular section, each of which is adapted to be connected to a source of fluid reactant. An outermost channel of annular section is adapted to be connected to a source of pressurized gas. The side wall of said upper section of said mixing chamber is generally aligned with the outer wall of said outermost channel.

The invention also provides a method for atomizing and mixing fluid reactants which comprises transporting separately streams of at least two fluid reactants along concentric paths at velocities of less than about 3 meters per second and a stream of pressurized gas at a velocity of at least about 15 meters per second along a path concentric to and surrounding the fluid reactants. The fluid reactants and gas are discharged axially into a generally cylindrically shaped mixing chamber and flow in a generally axial direction within said mixing chamber to atomize and entrain the fluid reactants in the pressurized gas stream to form an atomized fluid. Turbulence is induced in the atomized fluid at a point in the mixing chamber in the immediate vicinity of an axially aligned discharge orifice to substantially homogeniously mix the reactants within the atomized fluid, causing them to react at that point and in the discharge orifice and issue from the discharge orifice as a spray of product.

BRIEF DESCRIPTION OF THE DRAWINGS

Further objects and advantages of the invention will become apparent from the following description and claims and from the accompanying drawings wherein:

DETAILED DESCRIPTION OF THE INVENTION

Still other objects and advantages of the invention will become obvious to one of ordinary skill in the art after reading the following disclosure.

The conventional nozzle having means for internal mixing, such as a mixing chamber, is usually designed to maximize turbulence at the point where the several materials (i.e., liquids or gases) are to meet. The object is to achieve an homogeneous mixture of the several materials. In order to achieve a homogeneous mixture the several liquids need to be sufficiently mixed. It is usually desirable to induce a high level of turbulence so that the mixing is accomplished quickly. The apparatus, such as nozzles, that have been designed for mixing have therefore included a number of means to achieve high turbulence, such as swirling the materials while they are being mixed, joining the materials at right angles to each other, driving the materials across or through barriers to effect a breakup of the streams of materials, etc. Usually the high turbulence is induced well within the mixing chamber area of the nozzle.

The turbulent combining of materials at this point, i.e. the mixing chamber, is satisfactory for many applications. However, there are a number of applications where the turbulent mixing of materials well inside the mixing chamber will have undesirable side effects. As an example, when an organic acidic fluid material with long carbon chains and a concentrated basic fluid material are atomized and combined, the final product is usually either a powdery or a highly viscous, paste-like material. Combining these materials in a conventional nozzle having means for internal mixing will cause the materials to react and produce the paste *internally* and, unless there is an extremely high driving force to discharge the paste, the nozzle will rapidly become clogged. As a result, those materials that produce highly viscous materials upon combining are usually mixed externally. However, external mixing requires a large amount of energy, as for example, a large amount of pressurized air, to create sufficient turbulence in the materials to be combined. As a result external mixing is usually very costly.

Figure 1:
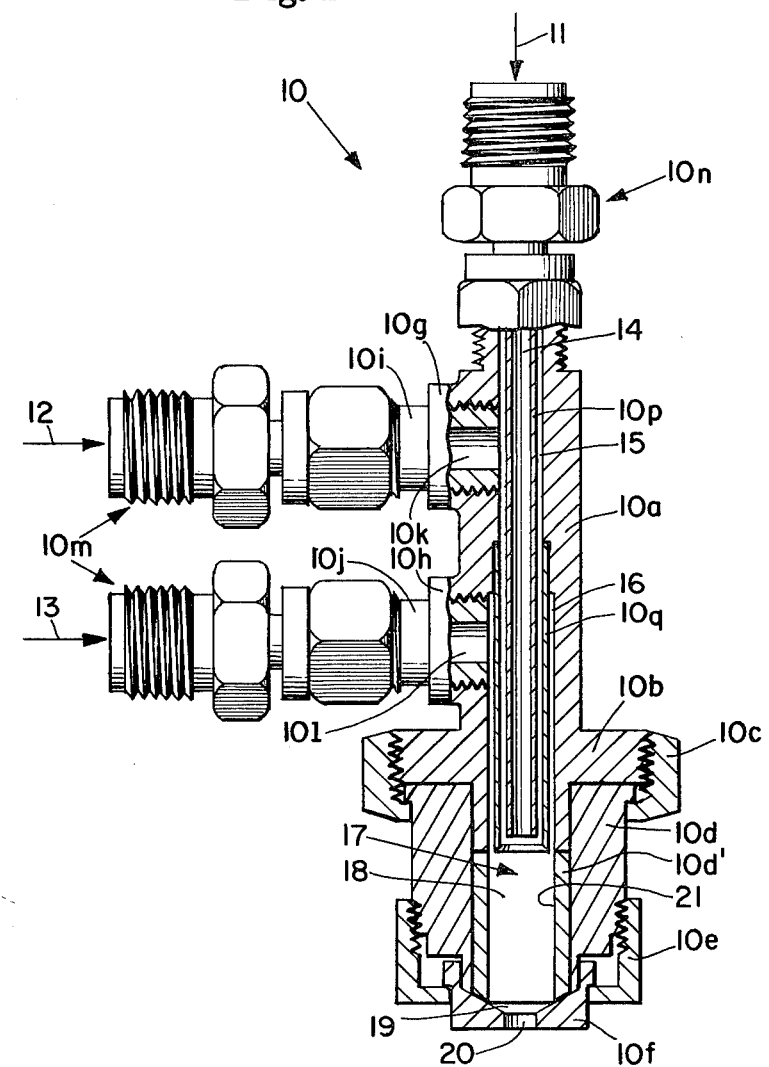
FIG. 1 is an elevational view, partially broken away and longitudinally cross-sectioned, of an embodiment of a spray nozzle of the present invention.
Figure 2:
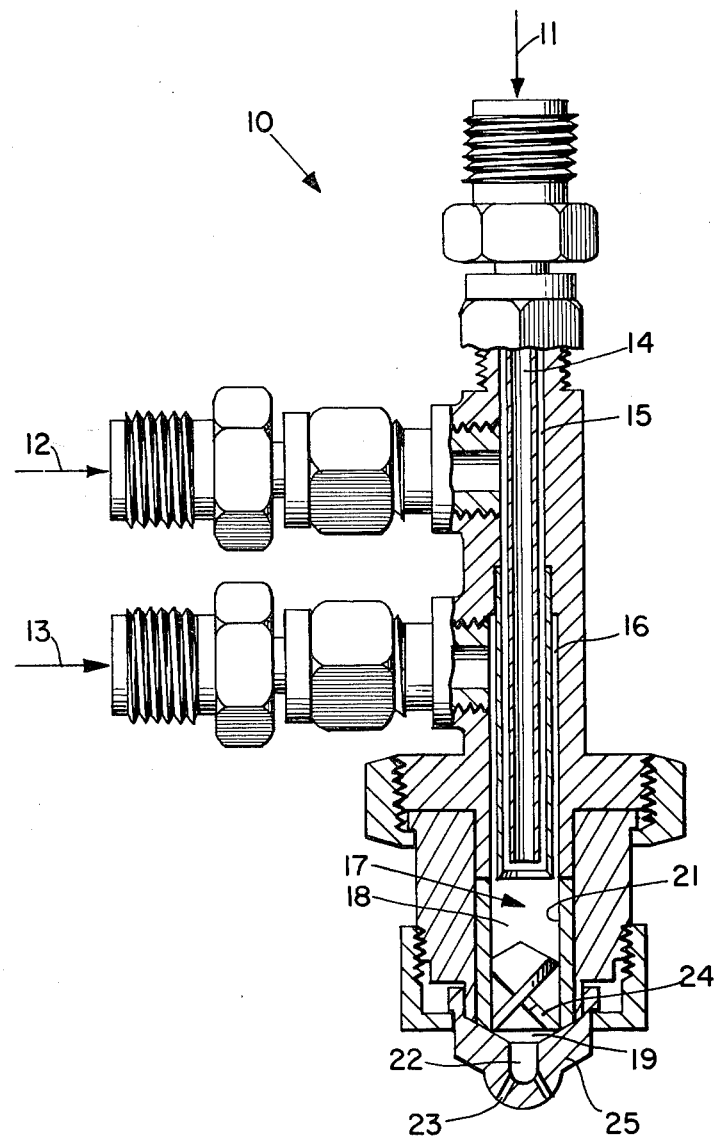
FIG. 2 is an elevational view, partially broken away and longitudinally cross-sectioned, of an alternative embodiment of a spray nozzle of the present invention which is particularly well suited for use in producing agglomerates or other solid particles containing a plurality of solid components.

The apparatus, shown in FIGS. 1 and 2, can be used in the process of the present invention to internally mix materials that combine to form highly viscous products. The apparatus, comprises, in FIG. 1, a nozzle 10 having a nozzle body 10a which is elongated and has an axial bore therethrough. Near one end of the body 10a, an annular flange 10b projects outwardly and has its exterior surface threaded and adapted to engage the interior thread on retainer ring 10c, which clamps chamber extension cap 10d in position against the lower side of flange 10b and telescoped over the lower end of the body 10a, with the axial bores of each aligned. A cylindrical liner 10d', constructed of polytetrafluoroethylene or other material having non-stick properties, is telescoped within the bore of extension cap 10d, abutting the depending cylindrical lower end of nozzle body 10a. The lower end of the liner 10d' is tapered to match the conical lower surface of cap 10d. The lower end of cap 10d is exteriorly threaded and engages the interior thread of retainer ring 10e by means of which orifice member 10f is held in position against the lower end of cap 10d and of liner 10d'. This presses the liner 10d' against the lower end of nozzle body 10a.

On the upper side of the body 10a bosses 10g and 10h have threaded studs 10i and 10j, respectively, threaded into or press-fit into through-bores interconnecting with the axial bore of the body 10a. Axial passageways 10k and 10l through studs 10i and 10j, respectively, are placed into communication with a source of fluid reactant 12 and a source of pressurized gas 13, respectively, by means of appropriate connector assemblies 10m.

At the top of the body 10a, exterior threads permit mounting connector assembly 10n thereon, placing the axial bore of the body 10a in communication with a source of fluid reactant 11.

The axial bore of the body 10a is machined to have four different diameters, the largest being at the bottom and diminishing in size as the upper end of the body 10a is approached. The varying diameters of the axial bore of body 10a are located and sized, as shown, to permit the cantilevering therein by any appropriate means of two concentric tubes 10p and 10q.

The apparatus described results in a nozzle 10 having a central channel 14 and two concentric annular channels 15 and 16 surrounding it. The two materials, e.g. fluid reactants 11 and 12, that are to be combined are directed through the central channel 14 and the inner annular channel 15, respectively, while a pressurized gas 13 is simultaneously directed through the outer annular channel 16. The nozzle 10 also includes a small, generally cylindrical mixing chamber 17, into which the two fluid reactants 11 and 12 and the pressurized gas 13 are directed, and a discharge orifice 20 located at the distal end of the nozzle. The two fluid reactants 11 and 12 and the pressurized gas 13 are all directed axially into the mixing chamber in order to minimize the amount of turbulence, and thereby control the mixing that occurs at the initial meeting point, in the upper section 18 of mixing chamber 17.

The nozzle 10 is designed to initially atomize the two fluid reactants 11 and 12 before substantial mixing occurs. To accomplish this the pressurized air 13 enters the mixing chamber 17 at a high velocity relative to the two fluid reactants 11, 12 and acts to strip the fluid streams, breaking the fluids into fine particle sizes. This atomization takes place in the upper section 18 of the mixing chamber 17 and is substantially completed, such that the fluid reactants 11 and 12 are both broken down into relatively small particle sizes, before the atomized fluids 11 and 12 and the gas 13 reach the lower section 19 of the mixing chamber near the discharge orifice 20.

The diameter of the discharge orifice 20 is sized to force a sudden, violent mixing of the atomized fluids 11 and 12 and the air 13. By abruptly narrowing down the cross sectional area of the mixing chamber 17 at the lower section 19 of the chamber to a relatively small diameter discharge orifice, the fluids are driven together and caused to mix. The mixing that occurs, however, is sufficiently close to the discharge orifice 20 to ensure that the mixing fluids will be discharged rather quickly after they are combined. This is very important in the case of the mixing of materials that combine to produce highly viscous products since the viscous product will not have time to completely form before it is driven from the mixing chamber 17 and into the discharge orifice 20 by the high velocity pressurized air. It has been found that for the example of mixing an organic acidic liquid with long carbon chains and a concentrated basic liquid, that the diameter of the discharge orifice 20 needs to be sized to produce a pressure drop of at least 2 atmospheres and preferably greater than 3 atmospheres in order to produce sufficient turbulence for a thorough mixing to occur and for the chemical reaction between the already atomized liquids 11 and 12 to be substantially completed.

For other fluids or materials that are desired to be atomized and mixed, the desired particle size may be different and therefore the desired pressure drop, which correlates to the desired particle size, can be readily determined by one of ordinary skill in the art.

In one preferred embodiment of the nozzle 10, shown in FIG. 1, the central channel 14 is 2.2 mm diameter, the inner annular channel 15 has a 3.2 mm inner diameter, a 4.6 mm outer diameter and the outer annular channel 16 has a 6.4 mm inner diameter and a 6.9 mm outer diameter. The mixing chamber 17 includes a generally cylindrical upper section 18 where the atomization occurs and a relatively short lower section 19 having a conically tapered lower wall that lies at an included angle with the side wall of the mixing chamber that is preferably between about 90° and 165°, and that converges to the centrally located orifice 20. The upper section 18 of mixing chamber 17 has a 6.9 mm diameter and is about 16.5 mm long and the lower section 19 has an entry diameter of 6.9 mm that tapers symmetrically inwardly at an included angle of about 143° to an exit diameter of 2.3 mm. The discharge orifice 20 is cylindrical in shape and is 2.3 mm in diameter and about 5.7 mm in length. However, the walls of the upper section 18 could also be tapered inwardly as long as the turbulence that is induced is not sufficient to cause an early formation of the highly viscous or powdery resulting product. For the example of an organic acidic liquid with long carbon chains and a concentrated basic liquid it was found that the upper section 18 was preferably substantially cylindrical. The lower section 19 of the mixing chamber 17 should still have the sharply converging walls and the relatively narrow discharge orifice 20 in order to create the necessary turbulence for rapid mixing of the acid and base. Additionally, it has been found that it is preferable to align the outer annular channel 16 for the pressurized gas 13 to the side or inner wall 21 of the mixing chamber 17 such that the gas 13 provides a constant cleaning action along the walls 21 to minimize the possibility of a buildup of either the fluids 11 and 12 or of the resulting product of their reaction along the wall. Hence the outer diameter of the outer annular channel 16 is substantially similar to the diameter of upper section 18 of mixing chamber 17.

Employing the present nozzle 10 for other particular applications, i.e. with other particular fluids besides the example of an organic acidic liquid with long carbon chains and a concentrated basic liquid, may require other design changes to the nozzle to optimize the system. In this preferred application of this nozzle, the reaction of an organic acidic liquid with long carbon chains and a concentrated basic liquid to form a viscous paste, the characteristics of the resulting paste make the use of the conventional internal mixing nozzles impossible since the generally high turbulence that is produced in those nozzles will cause the liquids to react, form the paste internally and eventually clog the nozzle. The alternative of an external mixing nozzle, while able to more easily handle the resulting highly viscous product, as previously indicated, requires considerably more compressed gas to accomplish the same result and, in a continuous production operation, the cost of the pressurized gas would be considerable.

The process for atomizing and mixing the materials to be reacted, such as the acidic liquid and the basic liquid, begins with the atomization of the materials. To accomplish this the materials to be combined, such as the acidic liquid and the basic liquid described in Example 1, below, are directed in stoichiometric rates into the upper section 18 of the mixing chamber 17 via the central channel 14 and the intermediate annular channel 15 at relatively low speeds of less than 3.0 meters per second, preferably less than 1.5 meters per second, and at a pressure of about 2 atmospheres. A quantity of gas 13, such as air, pressurized to at least about 2 atmospheres, preferably at least 3 atmospheres, is simultaneously directed into the upper section 18 of the mixing chamber 17 via the outer annular channel 16 at a relatively high rate of speed of at least 15 meters per second, preferably greater than 30 meters per second. The differential in the speeds between pressurized air and the two fluid reactants, e.g. the acid and base, must be sufficient to atomize the two fluid reactants as the three fluids enter the upper section of the mixing chamber 17. The acidic liquid and the basic liquid must be at least partially atomized and entrained in the air stream and also distributed substantially homogeneously in the air stream when the mixture reaches the lower section 19 of the mixing chamber 17. The lower section 19 of the mixing chamber 17, as indicated, is designed to induce a sudden, high turbulence in the mixture such that the partially atomized acidic liquid and basic liquids are driven together to be substantially completely mixed and to thereby begin reacting and forming the highly viscous paste product. However, at this point the mixture does not have enough time to proceed to a complete reaction since the mixture is being driven into and through the nozzle orifice 20 by the high velocity pressurized air, and the pressure of the incoming fluids. The bulk of the reaction therefore occurs within the discharge orifice 20 and preferably is completed when the materials in spray form exit from the discharge orifice 20, although with a pressure drop across the orifice of close to the minimum acceptable 2.0 atmospheres, the reaction may not be completed until a very short distance beyond the nozzle 10. The higher the pressure drop across the orifice 20 the more likely it is that the reaction will be completed before the materials exit from the orifice 20.

For the example of combining an organic acidic liquid with long carbon chains and a concentrated basic liquid, the best results are achieved when the more viscous of the acidic liquid and the basic liquid is directed through the intermediate annular channel 15. This allows the air to act quickly in atomizing the outermost, and more viscous, of the fluid reactants first before atomizing the less viscous fluid. Also, as previously indicated, the upper section 18 of the mixing chamber 17 into which the three fluids are directed is generally cylindrical in shape. In addition, mixing chamber 17 preferably has a length-to-diameter ratio of between about 2:1 and 5:1 which varies with the amount of energy required to effect atomization of the materials to be combined. In general, the more viscous the fluid reactants that are to be atomized, the greater the length necessary to effect the atomization without substantially increasing the velocity of the atomizing pressurized gas, e.g. pressurized air, and therefore increasing the amount of pressurized gas and the cost required for this process. For the particular example referred to above, the acid and base, it was determined that the minimum length of the mixing chamber is about 16.5 mm and the minimum length to diameter ratio is 2.4 to produce a homogeneous product. For neutralizing unstable organic acids at high throughput rates the length of the mixing chamber may have to be designed to minimize residence time of the fluid reactants within the mixing chamber.

The design for the lower section 19 is principally directed toward developing a high degree of turbulence at that point in the mixing chamber 17 to complete the atomization and to substantially homogeneously mix the materials immediately prior to passage through the discharge orifice 20. For ease of manufacture and for considerations of cost, the orifice is preferably centrally positioned relative to the inner walls of the upper section 18 of the mixing chamber 17. It has been found that where the discharge orifice 20 is centrally located the diameter of the discharge orifice should be sized to produce a pressure drop of at least 2 atmospheres with the preferred pressure drop being at least 3 atmospheres. With this information, a good estimate of the orifice diameter can be obtained by using the "orifice equation", as disclosed in Chapter 5, at page 11 in Perry, R. H., and Chilton, C. H., Chemical Engineers' Handbook, McGraw Hill Book Company, 5th Edition, New York (1973). It has also been determined using this equation and by experimental testing that there is an optimum diameter (and total cross-sectional area) for the discharge orifice for a given stock flow rate, i.e. the combined flow rate of the fluid reactants 11, 12. For example, for a stock flow rate of 9.1 kg/hr. the diameter should be about 1.6 mm (cross-sectional area of $2 \times 10^{-6} m^2$) and for 18 kg/hr. the diameter should be 2.3 mm (cross-sectional area of $4 \times 10^{-6} m^2$). Where the optimum area is not used, i.e. the area is larger or smaller, a proportionate increase in pressurized air is necessary to produce the final paste product.

The reaction that occurs in combining the atomized organic acidic liquid with long carbon chains, e.g. alkylaryl sulfonic acid and alkyl sulfuric acid, and the atomized concentrated basic liquid, e.g. 50% sodium hydroxide solution, is a neutralization reaction that produces either a powdery or a highly viscous anionic surfactant paste product, and energy in the form of heat. The viscosity of the resulting paste product will generally depend on the amount of moisture in the final paste product, and the amount of moisture is directly related to the amount of water in the concentrated basic liquid which is usually a solution of a basic material and water. Most of the water, which is introduced with the basic liquid and which resulted from the chemical combination of the acidic liquid and the basic liquid, can be evaporated by the heat of reaction. Anionic surfactants, such as those resulting from the above examples of fluid reactants, with moisture as low as 15% by weight have been produced. The final paste product at this moisture level is powdery in texture.

The homogeneity of the paste, i.e. the absence of unreacted acid or base, is a function of the gas to stock mass ratio, where the stock mass is the combined total mass of the acid and base materials entering the mixing chamber 17. For the example of the pressurized air 13 and the organic acidic liquid with long carbon chains and concentrated basic liquid, in order to produce a substantially homogeneous paste a minimum air to stock mass ratio of about 0.3 and preferably of about 0.4 is needed. This is considerably less than the value of 2.0 that is suggested as required for good atomization for external atomizing nozzles in such texts as K. Master, Spray Drying Handbook, John Wiley & Sons, New York (1979). Also it has been determined that the minimum air to stock mass ratio is independent of the stock flow rates.

The above-described nozzle 10 is especially useful in combining, i.e. atomizing and mixing, unstable organic acidic liquids, such as organic sulfuric acids, e.g. alkyl sulfuric acid and alkyl ethorylated sulfuric acid, with basic liquids such as sodium hydroxide, potassium hydroxide, sodium carbonate and potassium carbonate. The prior art method of externally atomizing and mixing acidic and basic materials would work satisfactorily for stable acidic liquids, such as organic sulfonic acids, since there is no time constraint for reacting the stable acidic liquids with a basic liquid. Unstable acidic liquids such as the organic sulfuric acids must be substantially neutralized quickly or they will hydrolyze to the acid's starting materials. By internally mixing and reacting the acidic liquid, stable or unstable, the length and time over which the reaction occurs can be controlled and minimized. The unstable acidic liquid can therefore be substantially, completely reacted before it begins to hydrolyze. However, where the unstable acidic liquid is being neutralized by a basic liquid special attention must be paid to the process to ensure that there is no localized, unreacted acidic material left in the resulting product, since that unreacted acidic material will hydrolyze and result in reduced yield from the reaction. Where a stable acidic liquid is being neutralized any unreacted acidic materials will not hydrolyze and can be neutralized at a later point in the process. To determine if there is any localized/unreacted acidic material, a universal pH indicator can be used in a test in which the indicator is adjusted to a pH of about 12 with sodium hydroxide solution and sprayed on a filter paper clamped onto a suitable frame. The filter paper is then quickly carried through the spray of product along a horizontal plane about 15 inches below the reactor nozzle. A change of color in spots indicates the presence of unneutralized acid particles.

In one particular example of atomizing and mixing an acidic material, such as a mixture of alkylaryl sulfonic acid and sulfuric acid, and a basic material, such as a sodium hydroxide solution, where sodium sulfate ($Na_2SO_4$) is one of the chemical products of the fluid reactants, there is some potential for clogging of the nozzle 10 to occur due to a buildup of the sodium sulfate ($Na_2SO_4$) along the walls of the mixing chamber 17. This problem is noted because similar clogging may occur with other combinations of materials and the problem can be corrected in a similar manner, as described below.

As previously indicated, the basic material is supplied in a solution with water, and the concentration of the basic material in the solution will directly affect the level of moisture in the final anionic surfactant paste product. It has been found that in a reaction that produces sodium sulfate ($Na_2SO_4$) as one of the chemical products of the fluid reactants, such as the example 2, described below, where the paste moisture was in the range of about 15–22% by weight (due to the solubility of the basic material, e.g. sodium hydroxide, the practical achievable lower limit of paste moisture is approximately 15%) there was no clogging; between the range of about 22–32% the clogging potential increased with increasing paste moisture, and above approximately 32% paste moisture the clogging potential decreased. These findings are summarized in FIG. 3, wherein the 15% to 22% range of paste moisture is assigned reference numeral A. The clogging was caused primarily by the sodium sulfate building up on the walls of the discharge orifice. This phenomenon of a changing clogging potential relating to paste moisture may be explained in terms of the availability of a saturated concentration of sodium sulfate within the nozzle. Where there is enough moisture present in the mixing materials the sodium sulfate is below its saturated concentration level and therefore will not crystallize and form a precipitate that could attach to the walls of the discharge orifice. Where the paste moisture level drops, for example, as it approaches 32% from a higher level, the sodium sulfate approaches its saturated concentration level and begins to precipitate out. As the moisture level comes closer to 32%, more sodium sulfate will precipate out. Thereafter, below 32%, the sodium sulfate concentration may become so high that a large amount of sodium sulfate crystals are precipitated. This large amount of sodium sulfate crystals apparently combines to produce a sand blasting effect which provides a continuous cleaning action along the orifice walls, thereby decreasing the clogging potential.

While it may be possible to define a material of construction for the nozzle 10 that avoids the buildup of sodium sulfate, or to increase the amount of compressed air (and hence the cost), one easily applied and inexpensive solution to the clogging problem is to periodically purge the nozzle with water. The water can be added through the caustic feed line when clogging is sensed by a loss of air flow rate. The water flow can continue for a predetermined period sufficient to dissolve and carry away the sodium sulfate. This solution is particularly adapted to solve the specific clogging problem associated with the use of the nozzle of the present invention in the preferred application of reacting an acid and a base that produces sodium sulfate. Other applications of the nozzle and other fluid reactants may produce different problems unique to the materials being combined.

An alternative embodiment of the present nozzle invention, shown in FIG. 2, is identical to the embodiment of FIG. 1 but in addition it includes a multi-orifice, wide-angle spray cap 25 provided with central discharge passageway 22, and a standard vane 24, available from Spraying Systems Company of 26250 Euclid Avenue, Cleveland, Ohio 44132, as catalog number 27, which is placed adjacent the lower section 19 of the mixing chamber 17. The passageways 23 are symmetrically arranged in a conical pattern about the axis of the nozzle 10 as, for example, six passageways 23 equally spaced at 60° intervals. Each of the passageways 23 is skewed with respect to the other and to the axis of the nozzle 10 but as a whole the passageways 23 have the combined effect of an axially aligned discharge orifice. The total discharge cross-sectional area of the passageways 23 in the cap is designed to be approximately equal to the cross-sectional area of the single central discharge passageway 22. Dividing the spray in this manner reduces the downward momentum of the paste particles, and, more importantly, provides a wider spray angle. The vane 24 is employed to further reduce the downward momentum of the paste particles and to increase the turbulent mixing of the air and the reactants in the lower section 19 of the mixing chamber 17 to thereby slightly reduce the amount of pressurized air that is required to produce the homogeneous paste.

The potential applications for this method and apparatus is limited only by the number of properly combined materials that, when combined, produce a powdery or highly viscous product. The following examples will further illustrate and describe this invention. In each of the examples, the nozzle employed the arrangement of channels, mixing chamber and orifice shown in FIG. 1 and was sized as described in connection with the description of a preferred embodiment thereof.

EXAMPLE 1

The reactor nozzle was fed with the following materials (all percentages are by weight):

A 50% sodium hydroxide solution (in water) was fed through the central channel 14 at a rate of 6.1 kg/hr. at room temperature and at a pressure of 5 atmospheres. An acid mix was directed through the inner annular channel 15 at a rate of 10.2 kg/hr. at 50° C. and a pressure of 5 atmospheres. The acid mix contained 21% alkyl sulfuric acid, 22% alkylethoxyl sulfuric acid, 25% alkylaryl sulfonic acid, and 29% sulfuric acid. Compressed air was fed through the outer annular channel 16 at a rate of 0.03 m³/min at room temperature and a pressure of 4.8 atmospheres. All temperature and pressure measurements were taken just upstream of the mixing chamber inlet.

The materials were fed continuously to the nozzle and upon exiting the discharge orifice 22 the materials had combined to produce a white, highly viscous paste product having a bulk density of about 1.0 gm/cc and a pH of a 1% solution of about 11. The paste was composed of 21% sodium alkyl sulfate, 17% sodium alkyl ethoxyl sulfate, 17% sodium alkylaryl sulfonate, 27% sodium sulfate and the remaining 18% was water. This product has utility as an ingredient for detergent compositions and can, for example, be directed to impinge upon a moving powder substrate for agglomeration purposes.

The nozzle was operated continuously for 4 hours and showed no sign of clogging. In addition, there was no evidence of any buildup along the walls of either the mixing chamber or the discharge orifice.

EXAMPLE 2

The reactor nozzle was fed with the following materials (all percentages are by weight):

A 50% sodium hydroxide solution (in water) was fed through the central channel 14 at a rate of 7.1 kg/hr at room temperature and at a pressure of 5 atmospheres. An acid mix was fed through the inner annular channel 15 at a rate of 11.1 kg/hr at a temperature of 50° C. and at a pressure of 5 atmospheres. The acid mix comprised 70% alkylaryl sulfonic acid and 30% sulfuric acid. Compressed air was fed through the outer annular channel 16 at a rate of 0.02 m³/minute at room temperature and at a pressure of 4.8 atmospheres. All temperature and pressure measurements were taken just upstream of the mixing chamber inlet.

The materials were fed continuously to the nozzle and upon exiting the discharge orifice 22 the materials had combined to produce a white, voluminous powder having a bulk density of about 0.2 gm/cc and a pH of a 1% solution of about 11.2. The product was composed of 54% sodium alkylaryl sulfonate, 29% sodium sulfate and the remaining 17% was water and has utility as an ingredient for detergent compositions.

Figure 3:
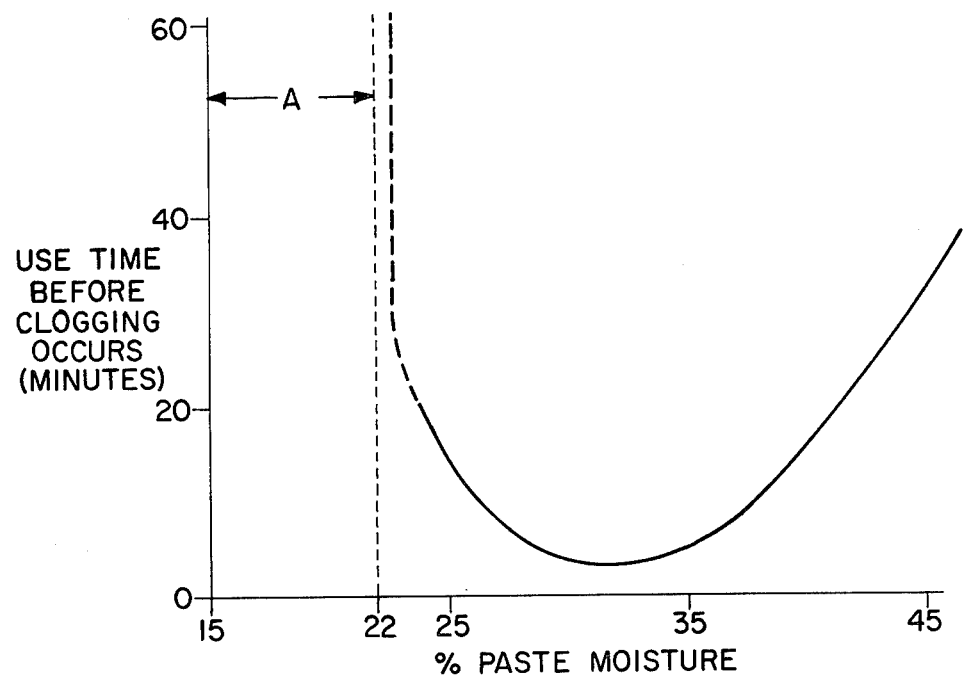
FIG. 3 is a graphical representation of the relationship between the percent moisture in the final paste product formed from a specific reaction of an acidic material and a basic material in the spray nozzle of FIG. 1 and the amount of time in a continuous production operation before clogging occurs in the nozzle where the final paste product is comprised in part of sodium sulfate.

The nozzle was operated continuously for more than 2 hours without any sign of clogging and there was no evidence of any buildup along the walls of either the mixing chamber or the discharge orifice. This result conforms with the graph of FIG. 3 since a paste moisture of 17% is within the area designated A in which there was no clogging.

EXAMPLE 3

The reactor nozzle was fed with the following materials (all percentages are by weight):

A 25% sodium hydroxide solution (in water) was fed through the central channel 14 at a rate of 10.2 kg/hr at room temperature and at a pressure of 5 atmospheres. An acid mix was fed through the inner annular channel 15 at a rate of 8.0 kg/hr at a temperature of 50° C. and at a pressure of 5 atmospheres. The acid mix comprised 70% alkylaryl sulfonic acid and 30% sulfuric acid. Compressed air was fed through the outer annular channel 16 at a rate of 0.03 m³/minute at room temperature and at a pressure of 4.8 atmospheres.

The materials were fed continuously to the nozzle and upon exiting the discharge orifice 22 the materials had combined to produce a white, viscous paste having a bulk density of about 1.0 gm/cc and a pH of a 1% solution of about 11.2. The product was composed of 36% sodium alkylaryl sulfonate, 19% sodium sulfate and the remaining 45% was water and has utility as an ingredient for detergent compositions.

The nozzle began to experience a buildup of sodium sulfate along the walls of the discharge orifice rather quickly and the nozzle began to clog in approximately 30 minutes. This result conformed to the graph of FIG. 3 for a paste moisture level of 45%. It was determined that the presence of a larger amount of water (over that present in the Example 2) and the subsequent increase in the moisture level of the paste product had caused a smaller amount of sodium sulfate to precipate out. At this level of precipitation, the sodium sulfate tended to cling to and build up along the walls of the discharge orifice and eventually clog the orifice. This clogging problem was corrected by purging the nozzle with 5 kg/hr of water for about 30 sec. The sodium sulfate ($Na_2SO_4$) dissolved and the nozzle returned to normal operation. To provide for a continuous operation the nozzle can be fed with water for about 30 seconds at 30 minute intervals.

EXAMPLE 4

The preferred embodiment of the reactor nozzle, described above, was fed with the following materials (all percentages are by weight):

A 30% sodium carbonate solution (in water) was fed through the central channel 14 at a rate of 11.2 kg/hr at a temperature of 40° C. and at a pressure of 4 atmospheres. An acid mix was directed through the inner annular channel 15 at a rate of 7 kg/hr. at about 50° C. and at a pressure of 4 atmospheres. The acid mix was composed of 21% alkyl sulfuric acid, 22% alkyl ethoxyl sulfuric acid, 28% alkyaryl sulfonic acid and 29% sulfuric acid. Compressed air was fed through the outer annular channel 16 at a rate of 0.016 $m^3$/min. at room temperature and at a pressure of 3.5 atmospheres.

The materials were fed continuously to the nozzle and upon exiting the discharge orifice 22 the materials had combined to produce a white foamy paste. The foaminess of the paste was due to the presence of $CO_2$ in the paste. The $CO_2$ quickly escaped into the air, dissipating the foamy texture of the paste. After the foam was dissipated, the paste had a bulk density of approximately 1.0 gm/cc and a pH of about 3 in a 1% solution. Since a pH of 3 was still slightly acidic the paste needed to be subjected to a post treating step. The paste was quickly trimmed to a pH of about 7 or above by mixing it with a 25% sodium hydroxide solution. (Note that in neutralizing acid with sodium carbonate, the pH of the prdduct should be kept below 5 to prevent the formation of sodium bicarbonate as a by-product. The sodium bicarbonate has a tendency to clog in a similar manner to the sodium sulfate precipitate referred to in Example 3, above. In addition, sodium carbonate neutralization of products with a pH over 5 uses twice as much of the material.) The product was composed of 15% sodium alkyl sulfate, 12% sodium alkyl ethoxyl sulfate, 12% sodium alkyaryl sulfonate, 20% sodium sulfate and the remaining 41% was water and has utility as an ingredient for detergent compositions.

The nozzle was operated for one hour and showed no sign of clogging and there was no evidence of any buildup along the walls of either the mixing chamber or the discharge orifice.

In connection with processes such as illustrated in Example 4 above, if the nozzle is operated in such a way that the pH of the resulting paste (prior to the post treating step) is 7-10, sodium bicarbonate ($NaHCO_3$) will be formed as a by-product and the sodium bicarbonate can clog the nozzle. If this happens, the nozzle should be purged with water and the process should be adjusted such that the pH of the resulting paste (prior to the post-treating step) is less than 5.

The materials of all of these examples were successfully combined and in each case the yield of the product that was consistently achievable was consistently above 90%.

Having shown and described the preferred embodiments of the present invention, various improvements and modification thereof will be readily apparent to those skilled in the art. In addition, while the theory of operation of the present invention is set forth hereinabove in a manner believed to be correct, the invention is not bound by such theory. Accordingly, the scope of the present invention should be considered in terms of the following claims and is understood not to be limited to the details of structure, theory and operation shown and described in the specification and drawings.

I claim:

1. A method for atomizing and mixing fluid reactants which combine to produce highly viscous products, said method comprising:
   (a) transporting separately streams of at least two fluid reactants along concentric paths at velocities of less than about 3 meters per second;
   (b) transporting separately a stream of pressurized gas at a velocity of at least about 20 meters per second along a path concentric to and surrounding said fluid reactants;
   (c) discharging said fluid reactants and gas concentrically and substantially axially into a generally cylindrically shaped mixing chamber;
   (d) causing said fluid reactants and said pressurized gas to flow along substantially concentric paths in a substantially axial direction within said mixing chamber, the relative velocity differential between said pressurized gas and said fluid reactants being sufficient to thereby atomize and entrain said fluid reactants in the pressurized gas stream to form an atomized fluid while minimizing the amount of turbulence induced to thereby control the mixing of said fluid reactants in the upper section of said mixing chamber; and
   (e) inducing sudden turbulence in said atomized fluid at a point in said mixing chamber in the immediate vicinity of an axially aligned discharge orifice to substantially homogeneously mix the reactants within said atomized fluid, causing them to react at that point and in said orifice and to issue from said discharge orifice as a spray of product.

2. The method of FIG. 1 in which the gas-to-stock mass ratio is at least about 0.3.

3. The method of claim 2 wherein the pressure drop across said discharge orifice is at least about 2 atmospheres.

4. The method of claim 3 wherein the outer portion of the stream of gas is discharged into said mixing chamber in general alignment with the side walls thereof.

5. The method of claim 4 wherein an organic acidic fluid and a concentrated basic fluid are the reactants being transported.

6. The method of claim 5 wherein said organic acidic fluid is a mixture of alkylaryl sulfonic acid and sulfuric acid and said concentrated basic fluid is a sodium hydroxide solution.

7. The method of claim 5 wherein said organic acidic fluid is a mixture of alkyl sulfuric acid, alkylaryl sulfonic acid, and sulfuric acid, and said basic fluid is a sodium hydroxide solution.

8. The method of claim 5 wherein said organic acidic fluid is a mixture of alkyl sulfuric acid, alkylaryl sulfonic acid and sulfuric acid and said concentrated basic fluid is a sodium carbonate solution.

9. The method of claim 5 wherein stoichiometric quantities of the organic acidic fluid and of the concentrated basic fluid are transported at a velocity of less than 1.5 meters per second, and said gas is air, pressurized to 4.8 atmospheres and transported at a velocity of at least 50 meters per second, such that there is a mass ratio of at least 1:3 of gas to fluid reactants and a pressure drop across said discharge orifice of at least 3.4 atmospheres, whereby a spray of a substantially neutralized paste product is formed.

* * * * *

UNITED STATES PATENT OFFICE
CERTIFICATE OF CORRECTION

PATENT NO. : 4,462,543
DATED : July 31, 1984
INVENTOR(S) : BENNY S. YAM

It is certified that error appears in the above-identified patent and that said Letters Patent are hereby corrected as shown below:

Column 9, line 42, delete "ethorylated" and insert therefor --ethoxylated--.

Column 13, line 37, delete "prdduct" and insert therefor --product--.

Signed and Sealed this

Eighth Day of January 1985

[SEAL]

Attest:

GERALD J. MOSSINGHOFF

Attesting Officer

Commissioner of Patents and Trademarks